United States Patent
Kotani et al.

(10) Patent No.: US 7,410,218 B2
(45) Date of Patent: Aug. 12, 2008

(54) HEADREST-ATTACHED VEHICLE SEAT

(75) Inventors: Tadao Kotani, Kaita-cho (JP); Kouichi Nakaya, Fuchu-cho (JP); Nanae Michida, Fuchu-cho (JP); Tamio Miyahara, Fuchu-cho (JP); Hiroshi Okiyama, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/085,266

(22) Filed: Mar. 22, 2005

(65) Prior Publication Data

US 2005/0253440 A1  Nov. 17, 2005

(30) Foreign Application Priority Data

Mar. 23, 2004 (JP) ............................. 2004-084458
Feb. 14, 2005 (JP) ............................. 2005-036852

(51) Int. Cl.
  *A47C 1/10* (2006.01)
(52) U.S. Cl. ....................... 297/408; 297/391
(58) Field of Classification Search ............ 297/216.12, 297/408, 391, 354.11, 403
See application file for complete search history.

(56) References Cited

U.S. PATENT DOCUMENTS

| | | | |
|---|---|---|---|
| 3,376,064 A * | 4/1968 | Jackson ...................... 297/391 |
| 5,531,505 A | 7/1996 | Baetz et al. |
| 5,622,405 A | 4/1997 | Pitencel |
| 5,806,933 A * | 9/1998 | Tsui et al. .................... 297/391 |
| 5,842,738 A * | 12/1998 | Knoll et al. ............. 297/216.12 |
| 5,906,414 A * | 5/1999 | Rus ............................. 297/408 |
| 5,934,750 A * | 8/1999 | Fohl ....................... 297/216.12 |
| 6,045,181 A * | 4/2000 | Ikeda et al. ............. 297/216.12 |
| 6,079,776 A * | 6/2000 | Breitner et al. ........ 297/216.12 |
| 6,129,421 A * | 10/2000 | Gilson et al. ................. 297/408 |
| 6,394,544 B1 * | 5/2002 | Bieven et al. ............. 297/283.4 |
| 6,616,235 B1 * | 9/2003 | Khavari et al. .............. 297/408 |
| 6,802,562 B1 * | 10/2004 | Hake et al. ............. 297/216.12 |
| 2003/0015631 A1 | 1/2003 | Chu |
| 2005/0218708 A1 * | 10/2005 | Gramss ....................... 297/408 |

FOREIGN PATENT DOCUMENTS

| | | |
|---|---|---|
| DE | 195 13 777 | 10/1995 |
| EP | 0 113 645 B1 | 7/1987 |
| FR | 2 689 825 | 10/1993 |
| GB | 2 302 268 | 1/1997 |
| JP | 07-039606 | 7/1995 |
| JP | 09-075167 | 3/1997 |
| WO | WO 00/69668 | 11/2000 |

OTHER PUBLICATIONS

European Search Report.

* cited by examiner

*Primary Examiner*—Sarah B McPartlin
(74) *Attorney, Agent, or Firm*—Studebaker & Brackett PC; Donald R. Studebaker

(57) ABSTRACT

A headrest-attached vehicle seat is provided in which a headrest is provided over a seat back. In the headrest-attached vehicle seat: the headrest includes a headrest body, and a neck-support portion which is provided under the headrest body; and the neck-support portion turns around a pivot which extends in the seat-width directions inside of the headrest body and moves in the front-and-rear directions, and the neck-support portion is positioned at a predetermined turning angle.

16 Claims, 9 Drawing Sheets

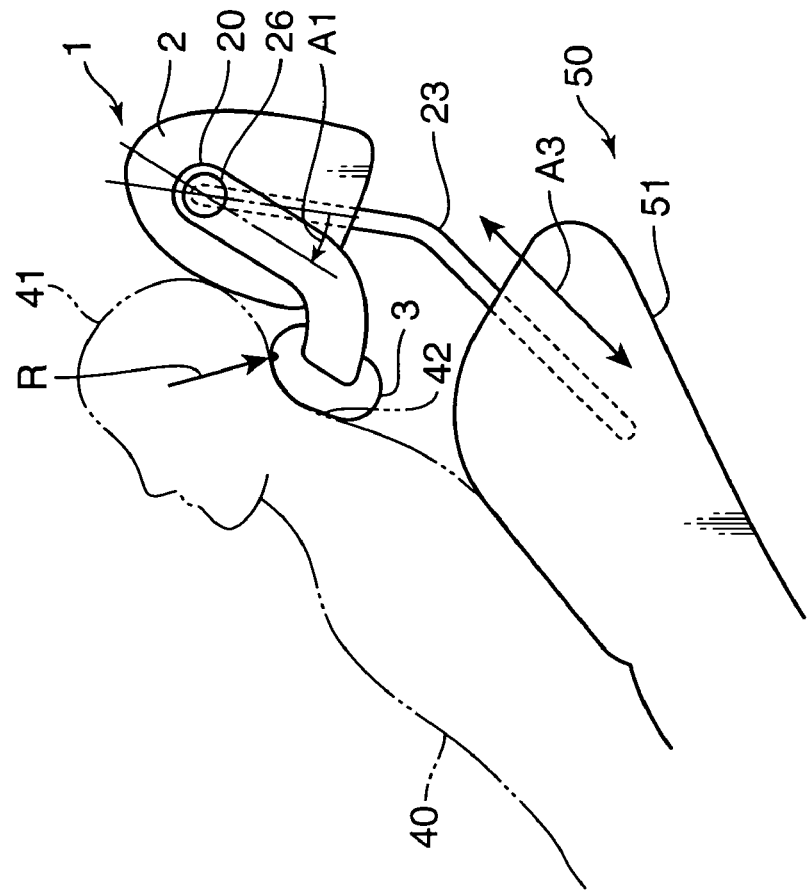
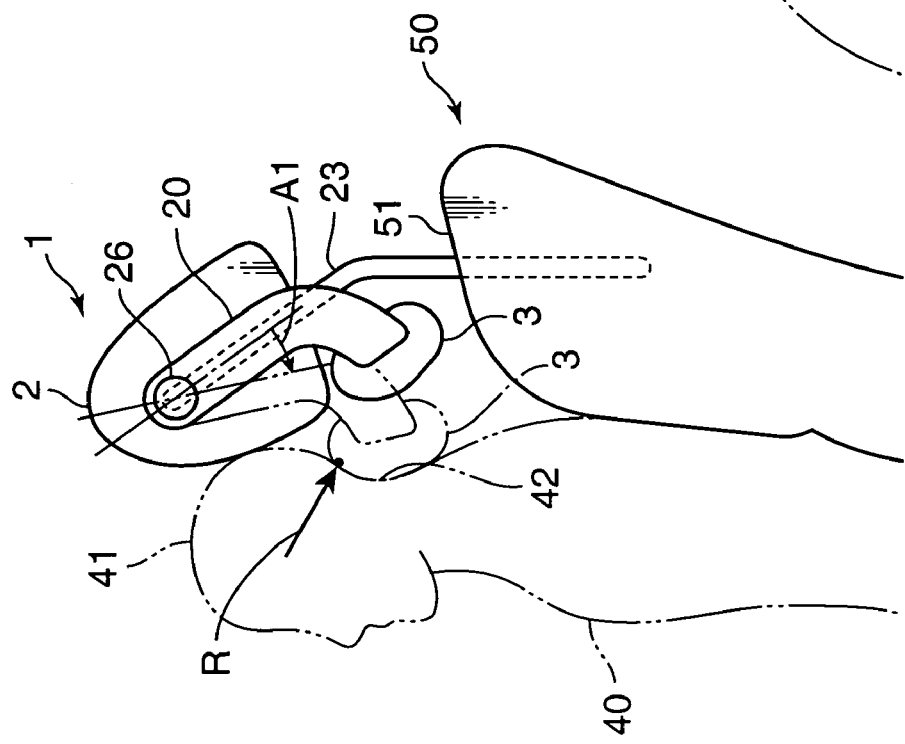

HEADREST-ATTACHED VEHICLE SEAT

BACKGROUND OF THE INVENTION

1. Field of the Invention

The present invention relates to a headrest-attached vehicle seat which is mounted in an automobile or the like. More specifically, it relates to a headrest-attached vehicle seat which is capable of restraining the head of an occupant, and if necessary, supporting the neck of the occupant suitably.

2. Description of the Related Art

Various structures have been proposed for a vehicle headrest or a headrest-attached vehicle seat. They are designed to protect an occupant, make the occupant feel comfortable, or for another such purpose.

For example, Japanese Utility Model Laid-Open No. 7-39606 specification has presented the following structure. To the top part of a seat back, a main portion is attached via a pole, and then, a side portion is attached to each of both sides of the main portion. These side portions can be turned in the seat's front-and-rear directions. The side portions are usually turned upward, so that it and the main portion can keep the head of an occupant in position. However, for example, when the vehicle corners, the occupant may receive great lateral G (i.e., inertia force in the right-and-left directions). Or, when the vehicle is running, the occupant in the passenger seat, the second-row seat or the like may be taking a nap so as not to keep the posture of the head. In such a case, the above described side portions are turned downward ahead of the seat, so that the occupant's head can be kept from swaying sideways.

According to Japanese Utility Model Laid-Open No. 7-39606 specification, as described above, if the side portions are turned downward ahead of the seat, the headrest can keep the head from swaying sideways beyond a predetermined range. But, it cannot support the occupant's neck. If the neck of the occupant (except the driver who is at the wheel) is supported when the occupant relaxes and takes the seat, that will lighten the occupant's supporting load on the head. Thus, the occupant can feel more comfortable. However, according to Japanese Utility Model Laid-Open No. 7-39606 specification, the headrest is not designed to support the occupant's neck. Thus, such an improvement in comfort as described above cannot be expected.

Taking this disadvantage into account, another headrest has been proposed, for example, in Japanese Patent Laid-Open No. 9-75167 specification. FIG. 9 is a perspective view of a headrest 190 which corresponds to the headrest according to Japanese Patent Laid-Open No. 9-75167 specification. The headrest 190 includes a headrest body 194 which is attached, via a pole, to the upper part of a seat back. Below the headrest body 194, an auxiliary portion 195 is provided which has a substantially concave shape so as to cover the headrest body 194 from both right-and-left sides and from below. In addition, the auxiliary portion 195 can be turned on a pivot 191 below the headrest body 194. At the time of regular use, the auxiliary portion 195 is turned upward, so that it is located on both right-and-left sides and below the headrest body 194 (see a chain double-dashed line in the figure). Thereby, it can restrain, together with the headrest body 194, the head of an occupant. On the other hand, for example, in the case where great lateral G is applied to the occupant, the auxiliary portion 195 is turned downward ahead of the seat, so that it extends ahead of the seat from below the headrest body 194. Thereby, both end portions 193 on both right-and-left sides of the auxiliary portion 195 prevents the occupant's head from swaying laterally. At the same time, a middle portion 192 in the middle of the auxiliary portion 195 restrains the occupant's neck.

Herein, the auxiliary portion 195 can be switched from an unused posture (see the chain double-dashed line) in which it stands above the pivot 191 to an in-use posture (see a solid line) in which it is turned forward by substantially 90 degrees from the unused posture, and vice versa. Besides, it is supposed to turn and stop midway, so that it can also be used in such a posture.

According to Japanese Patent Laid-Open No. 9-75167 specification which is described above, the auxiliary portion 195 is switched to the in-use posture. Thereby, the occupant's neck, head, body and the like can be fixed, thus helping the occupant get some sleep. But, such a headrest 190 needs to have a mechanism for constantly adjusting the position of the auxiliary portion 195 suitably for the occupant's body shape or sitting posture.

However, there is a disadvantage in that the headrest 190 does not have an enough function to adjust that position. For example, let's consider a case in which an adjustment in the up-and-down directions is made when the occupant's neck is supported on a front-end portion 192a of the middle portion 192. That adjustment can be easily made by moving the headrest 190 itself up and down with respect to the seat back. In contrast, an adjustment in the front-and-rear directions is difficult to make. If the in-use posture of the auxiliary portion 195 is standardized as the state in which it is turned forward by 90 degrees from the unused posture, then in the in-use posture, the front-end portion 192a will not have any front-and-rear positioning function. Besides, even if it is turned back and forth slightly from the in-use posture, then the front-end portion 192a moves simply in the up-and-down directions. In other words, it makes only a few moves in the front-and-rear directions. This is because the posture in which the auxiliary portion 195 is substantially horizontal is defined as the in-use posture. In that case, the tangential line of the turning circle of the front-end portion 192a extends substantially in the vertical directions.

Herein, it can be considered that the in-use posture of the auxiliary portion 195 is widened up to an almost vertical upright state. Thereby, the auxiliary portion 195 is largely turned within the range of the wider in-use posture. In that case, it appears as if the positional-adjustment width of the front-end portion 192a has become greater in the front-and-rear directions. However, such an increase in the positional-adjustment width in the front-and-rear directions as described below, can make the whole headrest 190 larger. This may cause a harmful effect, such as narrowing the driver's rear-view field. Hence, the above described disadvantage cannot be resolved.

As shown in FIG. 9, when the auxiliary portion 195 stays upright, the middle portion 192 is located at about half the height of the headrest 190. This structure is necessary for securing a certain distance (or turning radius) between the pivot 191 and the front-end portion 192a (i.e., if this turning radius is short, the positional-adjustment width in the front-and-rear directions is not expected to become greater, even though the range of the in-use posture is widened close to the upright state. In short, it is impossible to support the neck adequately, which is located ahead of the back of the head). If the neck is supported when the auxiliary portion 195 stays nearly upright, the back of the head lies apart above the front-end portion 192a. In order to restrain the back of the head in such a high position, the headrest body 194 has to be placed in a higher position. In that higher position, the occupant's head which tends to sway up and down or from side to side when the vehicle is running, needs to be kept in position. To do that effectively in such a higher position, the headrest body 194 must be longer in the right-and-left directions. In other words, the headrest body 194 becomes larger, thus resulting in the headrest 190 being large-sized.

If the headrest 190 becomes larger, that will narrow the rear or front view-field of the driver or the occupant. For example, let's assume that a large-sized headrest 190 is used for the second-row seat or a rear seat behind it. In that case, when the driver confirms the rear view by looking back or using a rearview mirror provided in a front header, a larger part of the viewing field is obstructed by the headrest 190. In short, the rear-view field becomes narrower. Besides, for example, let's assume that a large-sized headrest 190 is used for a seat (including the passenger seat) ahead of the rearmost seat. In that case, the front-view field of an occupant who sits behind the front seat becomes narrower, thereby making the occupant feel oppressed.

As described above, in the structure according to Japanese Patent Laid-Open No. 9-75167 specification, unless a head rest is made larger, it cannot have an adequate adjustment width. Hence, an occupant's neck is difficult to properly support.

SUMMARY OF INVENTION

In view of the above described disadvantages, it is an object of the present invention to provide a headrest-attached vehicle seat which is capable of keeping a headrest from becoming larger, restraining an occupant's head effectively, and if necessary, properly supporting the occupant's neck, using its adequate adjustment width.

In order to resolve the above described disadvantages, a headrest-attached vehicle seat according to the present invention comprises: a seat back; and a headrest which is provided over the seat back wherein said headrest includes: a headrest body; a lateral shaft, which extends in the seat-width direction and which is provided on the headrest body; a neck-support portion which is provided lower side of the headrest body via said lateral shaft in such a manner that said neck-support portion is rotatable around an axis of said lateral shaft; and a position holding means for holding an angular position of the neck-support portion at a desired angle with respect to the headrest.

These and other objects, features and advantages of the present invention will become more apparent upon reading of the following detailed description along with the accompanied drawings.

BRIEF DESCRIPTION OF THE DRAWINGS

FIG. 3A is a side view of the headrest-attached vehicle seat shown in FIG. 1, showing a regular sitting state as an example of the mode of usage. FIG. 3B is a side view of the headrest-attached vehicle seat, showing a reclining state.

DETAILED DESCRIPTION OF INVENTION

Figure 1:
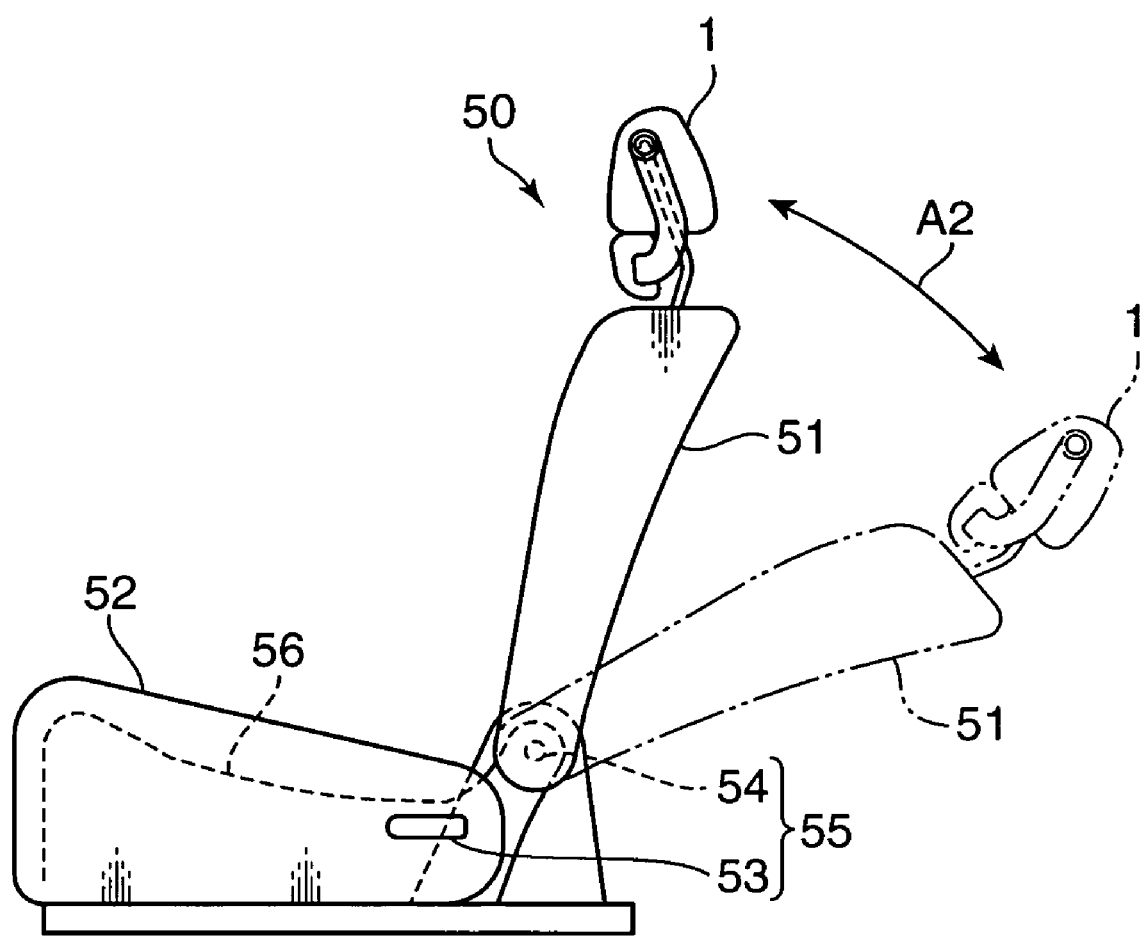
FIG. 1 is a side view of a headrest-attached vehicle seat according to a first embodiment of the present invention.

Hereinafter, a headrest-attached vehicle seat according to each embodiment of the present invention will be described with reference to the drawings. FIG. 1 is a side view of a headrest-attached vehicle seat 50 (hereinafter, referred to simply as the seat 50) according to a first embodiment of the present invention. There are no restrictions on the seat 50's position. However, it is especially preferable that the seat 50 be placed as a seat except the driver's seat, specifically, a seat in which an occupant may relax (e.g., take a nap) while the vehicle is running. The seat 50 is formed mainly by a seat cushion 52 with a seat pan 56 inside which supports the surface where the occupant sits, and a seat back 51 as a seat in which the occupant leans back. In addition, over the seat back 51, a headrest 1 is provided which restrains the occupant's head, and if necessary, the neck.

The seat 50 is provided with a reclining mechanism 55 which can freely recline the seat back 51. The reclining mechanism 55 includes, for example, a lever 53 and a hinge portion 54. The front part of the lever 53 is raised and turned, so that the seat back 51 can be shifted (see an arrow A2) from a regular sitting state (see a solid line in the figure) to a reclining state (see a chain double-dashed line). The seat back 51 can also be suitably kept midway.

Herein, in this embodiment, the up-and-down, front-and-rear and right-and-left directions indicate, as their reference, the direction in which the occupant is seated in the regular sitting state in the seat 50. Hence, the seat-width directions are equivalent to the right-and-left directions, or the vehicle-width directions. However, this reference is excluded if such a description is especially given.

Figure 2:
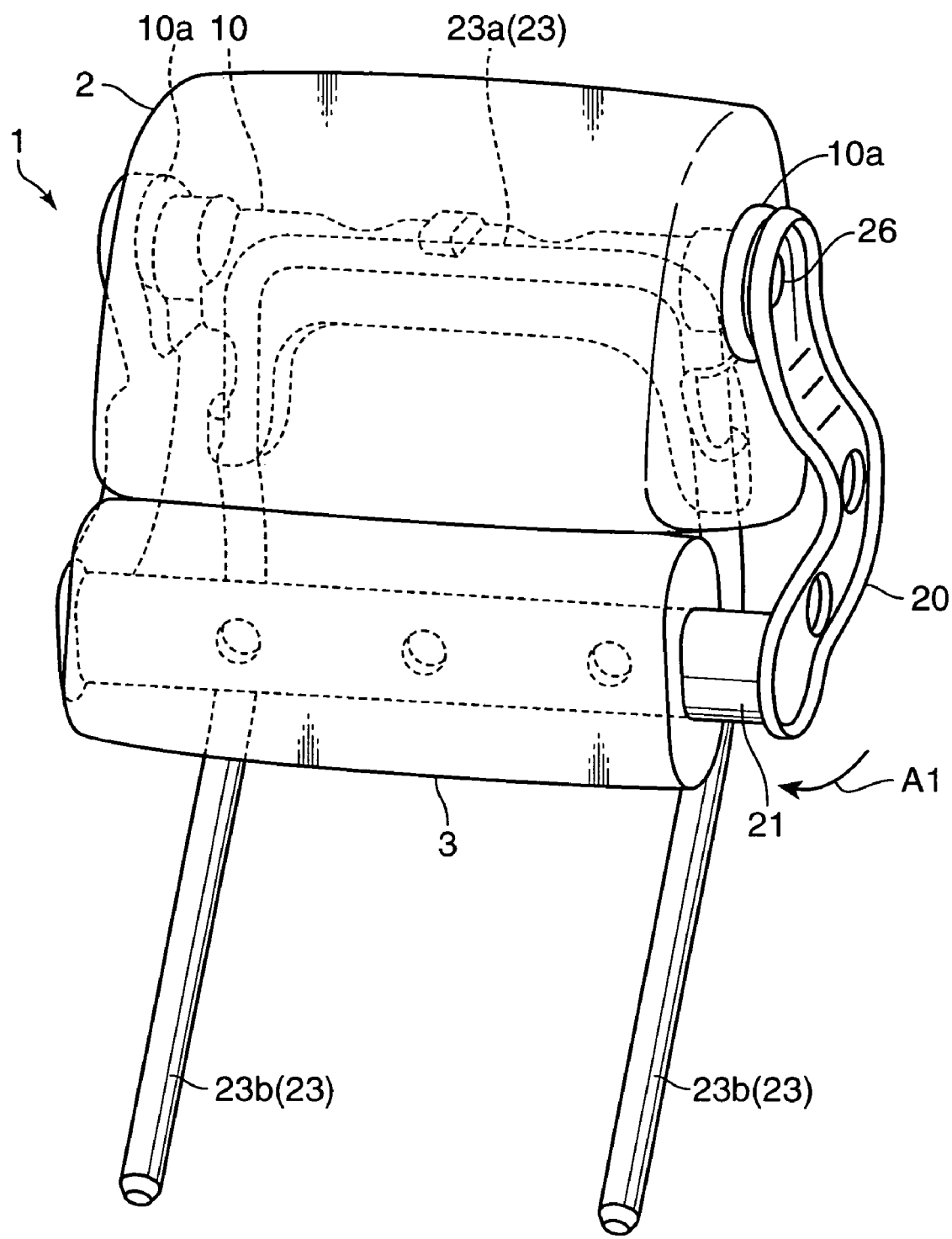
FIG. 2 is a perspective view of a headrest shown in FIG. 1. seat according to a first embodiment of the present invention.

FIG. 2 is a perspective view of the headrest 1. The headrest 1 is configured mainly by: a headrest body 2; a pole 23 which connects the headrest body 2 to the seat back 51; a neck-support portion 3 which is provided under the headrest body 2; and a turning arm 20 which supports the neck-support portion 3 so that it can be turned around the headrest body 2.

The headrest body 2 is a member which mainly restrains the occupant's head from moving back too far. The headrest body 2 is, for example, a molded body which is produced by skin composite foaming. It is shaped as a whole like a long pillow.

The pole 23 is a rod-shaped body which is bent into a substantially upside-down U-shape in front view. It is made up of a base portion 23a which extends in the vehicle-width directions, and a pair of right and left leg portions 23b which extends downward from both ends thereof. The base portion 23a is buried in the headrest body 2, with kept covered in a pole-base holder 10. The leg portion 23b protrudes, on its tip side, from below the headrest body 2. In the seat back 51, a pole holder (not shown) is provided which accepts the protruding leg portion 23b of the pole 23. The pole 23 is fit and inserted into the pole holder, so that the headrest 1 can be attached to the seat back 51. In addition, the depth to which the pole 23 is inserted, or the height of the headrest 1, can be suitably adjusted and fixed by a publicly-known mechanism.

The pole-base holder 10 is provided, at both ends thereof in the vehicle-width directions, with a shaft-support member 10a. The shaft-support member 10a supports a pivot 26 (i.e., a lateral shaft: described later) of the turning arm 20, so that the turning arm 20 can be freely turned. Its tip part which engages with the pivot 26 juts out from the side of the headrest body 2. The shaft-support member 1a is located on the upside in the headrest body 2, specifically, above the middle thereof in the up-and-down directions.

The neck-support portion 3 is a member which, in case of need, supports an occupant's neck from behind. The neck-support portion 3 is, for example, a molded body which is produced by skin composite foaming. It is thinner than the headrest body 2 in the height and front-and-rear directions. It is shaped like a pillow whose width is substantially equal to that of the headrest body 2. In the neck-support portion 3, a neck-support core material 21 penetrates so as to extend in the right-and-left directions. The neck-support core material 21 projects, at both ends thereof, from both sides of the neck-support portion 3. The front surface of the neck-support portion 3 is in-curved so as to support the occupant's neck stably. In FIG. 2, the front surface of the neck-support portion 3 is curved, so that both end sides thereof in the seat-width directions protrude forward from its middle part. Besides, it is curved, so that both ends thereof in the seat-width directions protrude upward from the middle part of its upper-end surface. A curvature radius R (see FIGS. 3A, 3B) of the upper-end front surface near the middle part in the seat-width directions, is 25±10 mm. Thereby, it can be easily fitted to the average shape of a neck part 42 of an occupant 40.

The turning arms 20 are a pair of right and left members and connect each shaft-support member 10a and each ends of the neck-support core material 21. Thereby, the neck-support portion 3 is supported on the headrest body 2, so that it can be freely turned. Each turning arm 20 is joined, at its lower end, to each end of the neck-support core material 21. On the other hand, at the upper end of each turning arm 20, the pivot 26 is formed which protrudes in the opposite directions to each other (i.e., toward the inside of the headrest body). The pivot 26 is fitted into the shaft-support member 10a, so that it can be supported and freely turned. Therefore, the neck-support portion 3 and the turning arm 20 can be united and freely turned around the pivot 26. The neck-support portion 3 can be turned forward from its rearmost position (see an arrow A1 of FIG. 3A), for example, at a maximum angle of about 60 degrees.

The pivot 26 is provided with an engagement protrusion, and the shaft-support member 10a is provided with a ring-shaped part. They are pressed onto each other so as to come into contact and are engaged by a well-known friction mechanism which uses frictional force (constituting a position holding means). Using this friction mechanism, the occupant turns the turning arm 20 (or the neck-support portion 3) by a force of 30 to 100 N against such frictional force. Then, it is designed to be slowly turned. If the occupant stops turning it, the turning arm 20 is kept in that position (i.e., at that turning angle), and then, it is fixed there.

Next, an operation of the seat 50 will be described according to the mode of usage. FIGS. 3A and 3B each show an example of the mode of usage in the seat 50. In FIG. 3A, a regular sitting state is shown, and in FIG. 3B, a reclining state is shown.

In FIG. 3A, specifically, the seat 50 is in the regular sitting state, and the neck-support portion 3 is in a first posture (see a solid line in the figure) and in a second posture (see a chain double-dashed line).

The first posture of the neck-support portion 3 is a posture in which the turning arm 20 is turned so that the neck-support portion 3 is in the rearmost position within its turning angle range. It is a posture in which the front surface of the headrest body 2 is substantially on the same plane with the front surface of the neck-support portion 3. In contrast, the second posture is a posture (see the arrow A1) in which the neck-support portion 3 is turned forward from the first posture.

In the regular sitting state, the upper-half body of the occupant 40 and a head part 41 lie substantially vertically. As shown in the figure, the occupant 40 is seated with the head part 41 being rested (leaned) against the headrest body 2. Or, the occupant 40 is seated with leaving a narrow space between the head part 41 in a sitting state and the headrest body 2.

In the regular sitting state, the first posture is preferable, for example, in the case where the head part 41 of the occupant 40 is not swayed sideways so much, and thus, the function of restraining the head part 41 from moving back is mainly required. In other words, it is preferable in the case where the headrest 1 is used for the same purpose as that of a general headrest which is conventionally used. In this first posture, the front surface of the headrest body 2 and the front surface of the neck-support portion 3 forms substantially the same plane. Over this large area, the head part 41 of the occupant 40 can be retrained, thus securely keeping the head part 41 in position.

For example, if the occupant 40 is subjected to great forward acceleration when suddenly accelerating, bumping, or the like, then the head part 41 bears a great backward load (or inertia force). Thereby, the head part 41 would be forced to move back. However, the head part 41 is restrained, by the headrest body 2, from moving back from the position where it is in contact with the headrest body 2. This helps effectively prevent the neck part 42 from bearing an excessive load.

In addition, the front surface of the headrest body 2 is substantially on the same plane with the front surface of the neck-support portion 3. Therefore, over such a larger area, they can both bear the load from the head part 41 and the neck part 42. Thereby, an impact can be dispersed.

In contrast, in the regular sitting state, the second posture of the neck-support portion 3 is preferable, for example, in the case where the head-restraining function needs to be heightened, the occupant 40 is often swayed sideways, the occupant 40 wants to be seated in a relaxed state, or the like.

An operator grasps and turns the neck-support portion 3 or the turning arm 20, so that the posture can be switched from the first posture to the second posture, and vice versa. If the operator stops turning it at a desired turning angle, the above described friction mechanism keeps it fixed in that position. In this turning operation, when the neck-support portion 3 is in the first posture, the tangential line of the turning circle is substantially horizontal. Thus, the neck-support portion 3 moves largely in the front-and-rear directions which is the substantially tangential directions of the turning circle. At that time, however, it makes hardly any motion in the up-and-down directions. In other words, in such a frequently-used mode, the height of the neck-support portion 3 is not changed so much, and thus, it remains in its low position. In that state, the position of the neck-support portion 3 can be adjusted widely in the front-and-rear directions. Besides, this brings the position where the head part 41 is restrained in the headrest body 2 to a relatively low part of the entire headrest 1 (i.e., close to the middle of the headrest 1, as shown in the figure). Therefore, the whole headrest 1 can be effectively prevented from becoming larger.

In addition, the pivot 26 is provided on the upside in the headrest body 2. Thereby, the turning radius of the neck-support portion 3 becomes longer than that in the case where the pivot 26 is provided on the downside in the headrest body 2. In other words, the distance of a motion in the front-and-rear directions which corresponds to the turning angle becomes greater. Hence, an adjustment can be made over a longer distance in the front-and-rear directions. Simultaneously, Besides, the position in which the neck-support portion 3 is held can be finely adjusted without difficulty.

If the neck-support portion 3 is switched into the second posture, when the head part 41 moves back, the head part 41 and the neck part 42 are certainly restrained by the headrest body 2 and the neck-support portion 3, respectively. Therefore, the head-restraining effect becomes greater than that in the first posture where only the head part 41 is restrained by the headrest body 2 alone.

Furthermore, as shown in the figure, if the occupant 40 is seated with the neck part 42 rested against the neck-support portion 3, that relieves the load on the neck part 42 which the occupant 40 has to bear to support the head part 41. Thereby, the occupant 40 can feel more comfortable. Besides, the front surface of the neck-support portion 3 is curved, so that both end sides thereof in the seat-width directions protrude forward from its middle part. Besides, it is curved, so that both ends thereof in the seat-width directions protrude upward from the middle part of its upper-end surface. Therefore, for example, even if the occupant 40 receives lateral G, and the head part 41 is swayed sideways, restoring force is applied to the neck part 42, so that it can be gently restored to the middle in the right-and-left directions. Hence, the neck part 42 is restrained from swaying sideways excessively, even though it may sway laterally to some extent. Moreover, the curvature radius R of the upper-end front surface near the middle part in the seat-width directions of the neck-support portion 3, is designed to be 25±10 mm. Thereby, it can be easily fitted to the average shape of the neck part 42 of the occupant 40. This also helps the occupant 40 feel more comfortable.

In further detail, FIG. 3B shows a state in which the seat 50 is reclined and a state in which the neck-support portion 3 is in the second posture. As shown in this figure, the occupant 40's upper-half body and the head part 41 are tilted in the reclining state. Gravity is applied to the head part 41 so as to force it to move down. If only the neck part 42 supports the head part 41 against such gravity, it has to bear a great load. Thus, the head part 41 rests on the headrest body 2, so that it can be supported by the headrest body 2. This helps lighten the load on the neck part 42. Besides, as shown in the figure, in the second posture, the neck part 42 is supported by the neck-support portion 3. Thereby, the load on the neck part 42 can be largely lightened.

Herein, before or after the position of the neck-support portion 3 is adjusted, using a known mechanism, the depth to which the pole 23 is inserted into the seat back 51 may also be adjusted (see an arrow A3). Thereby, the head part 41 and the neck part 42 suitably come into contact with and are supported by the headrest body 2 and the neck-support portion 3, respectively.

Figure 4:
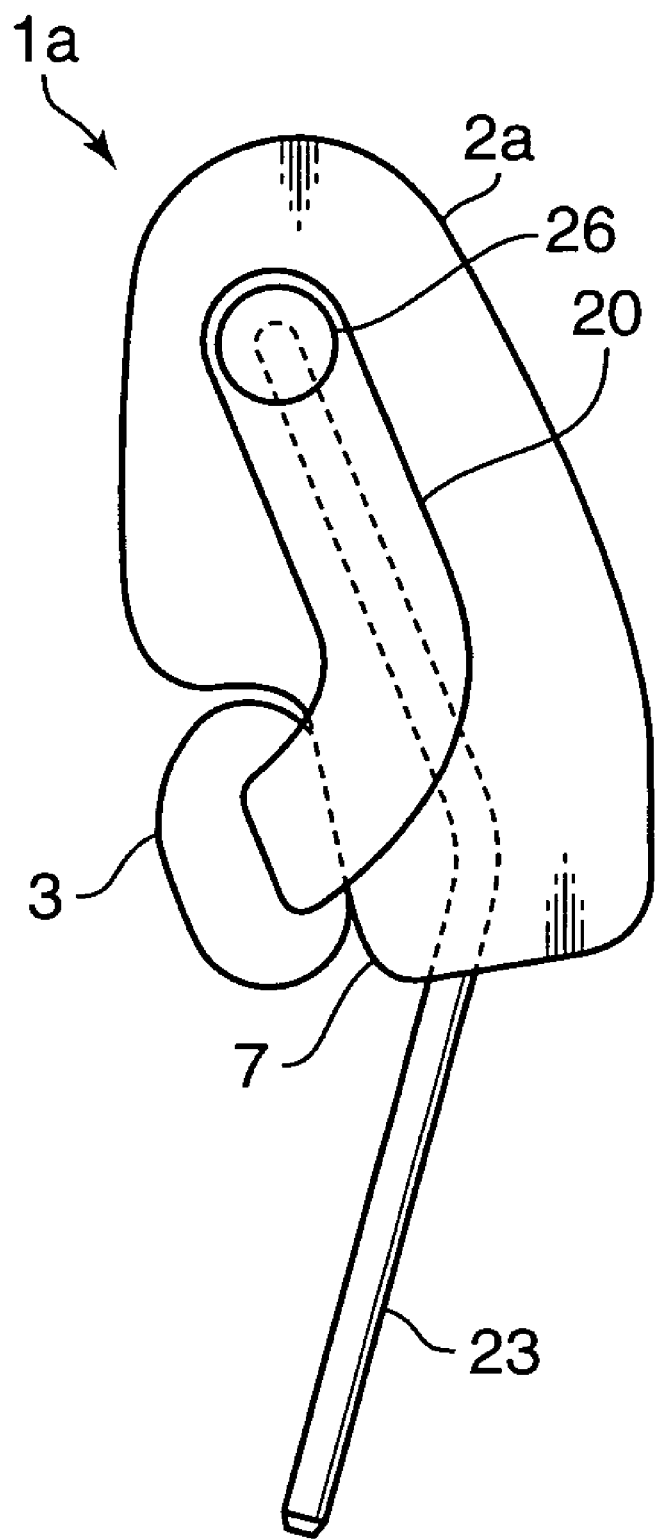
FIG. 4 is aside view of a headrest of a headrest-attached vehicle seat according to a second embodiment of the present invention.

FIG. 4 is a side view of a headrest 1a of a headrest-attached vehicle seat according to a second embodiment of the present invention. In this and the following embodiments, the component elements other than the headrest are the same as those of the first embodiment, and thus, their repeated description is omitted. In addition, the members which have the same function as those of the first embodiment are given the identical reference characters and numerals, and thus, their repeated description is omitted.

The headrest 1a according to this embodiment includes a headrest body 2a which is different from that of the headrest 1 according to the first embodiment. The headrest body 2a is provided with a downward-extending portion 7 which extends below the headrest body 2 according to the first embodiment. When the neck-support portion 3 stays in the first posture, the downward-extending portion 7 is in contact with the neck-support portion 3. This restricts the neck-support portion 3's backward movement from there.

According to this configuration of the headrest 1a, the neck-support portion 3 can be more certainly kept from moving back overly. For example, when the vehicle collides, or in such a case, the neck-support portion 3 bears a great backward load. Specifically, if the load is applied which is equivalent to the force that exceeds the relative-position holding power (i.e., the frictional force of the friction mechanism) between the pivot 26 and the shaft-support member 10a, then the neck-support portion 3 may be moved back. Even in that case, the downward-extending portion 7 securely receives and stops the neck-support portion 3. Thereby, it can be prevented from moving farther than its rearmost position.

Figure 5A:
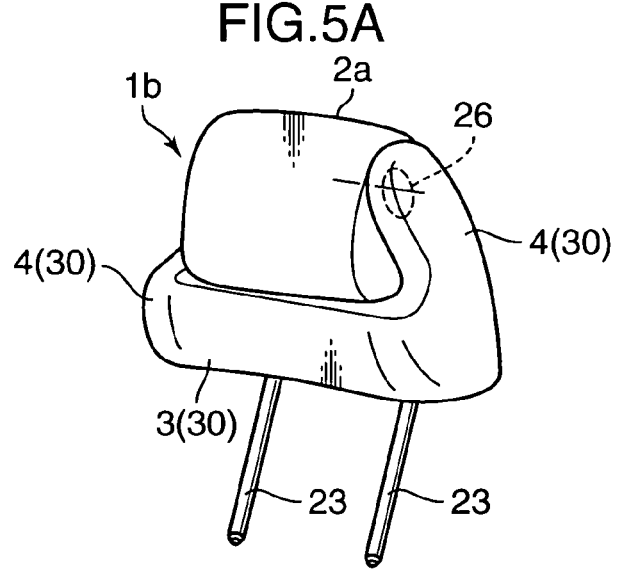
FIG. 5A is a perspective view of a headrest of a headrest-attached vehicle seat according to a third embodiment of the present invention, showing a neck-support portion in a first posture.
Figure 5B:
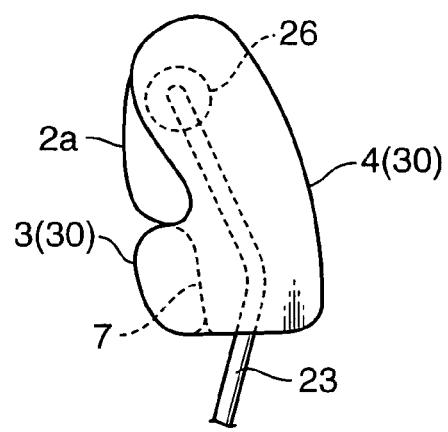
FIG. 5B is a side view of the headrest of FIG. 5A.
Figure 5C:
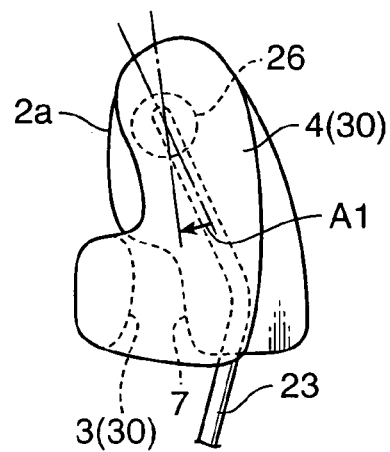
FIG. 5C is a side view of the headrest, showing the neck-support portion in a second posture.

FIG. 5A is a perspective view of a headrest 1b of a headrest-attached vehicle seat according to a third embodiment of the present invention, showing the neck-support portion 3 in the first posture. FIG. 5B is a side view of the headrest 1b of FIG. 5A. FIG. 5C is a side view of the headrest 1b, showing the neck-support portion 3 in the second posture.

The headrest 1b includes an end-part extending portion 4 at each of both ends of the neck-support portion 3 according to the second embodiment. In this respect, it is different from the headrest 1a according to the second embodiment. As shown in FIGS. 5A, 5B, if the first posture in which the neck-support portion 3 is located in its rearmost position is seen from ahead, the end-part extending portion 4 extends upward from each of both ends thereof in the seat-width directions. The neck-support portion 3 and the end-part extending portion 4 are united into an auxiliary body 30. The turning arm 20 is built in the end-part extending portion 4. Hence, as shown in FIG. 5C, the entire auxiliary body 30 which includes the neck-support portion 3 can be turned as one unit around the built-in pivot 26 (see an arrow A1).

The headrest 1b has all the operation and advantages of the headrest 1a according to the second embodiment. Besides, the end-part extending portion 4 is provided, thereby allowing the occupant 40 to grasp this end-part extending portion 4 and turn the neck-support portion 3. As a result, it can be turned more easily, thus facilitating a fine positional adjustment greatly.

Figure 6A:
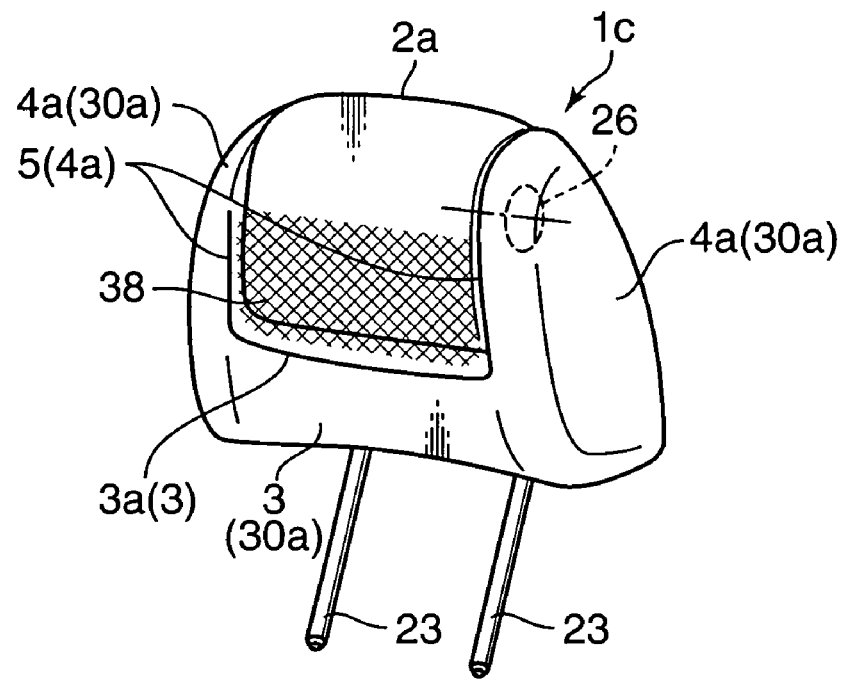
FIG. 6A is a perspective view of a headrest of a headrest-attached vehicle seat according to a fourth embodiment of the present invention.
Figure 6B:
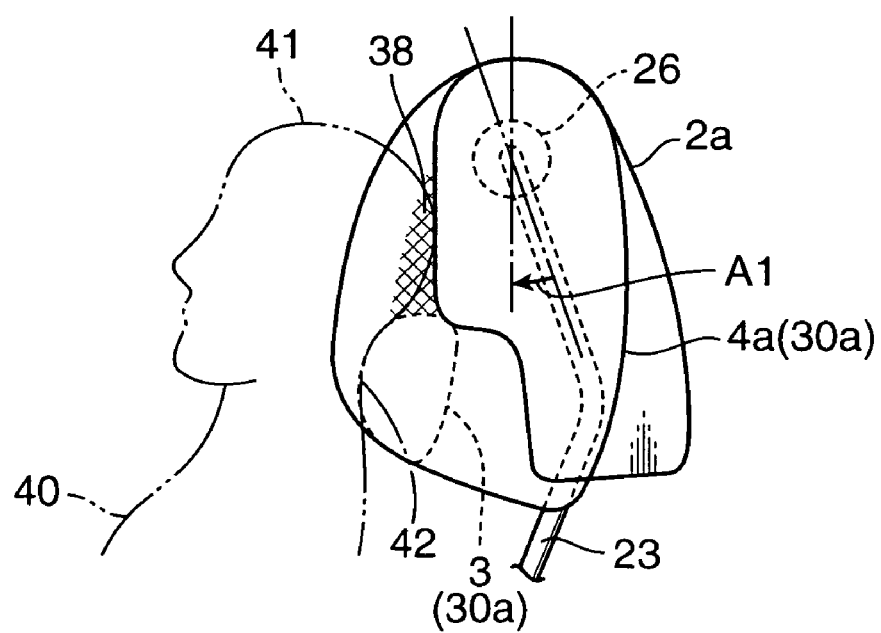
FIG. 6B is a side view of the headrest of FIG. 6A.

FIG. 6A is a perspective view of a headrest 1c of a headrest-attached vehicle seat according to a fourth embodiment of the present invention. FIG. 6B is a side view of the headrest 1c of FIG. 6A.

The headrest 1c includes an end-part extending portion 4a, instead of the end-part extending portion 4 according to the third embodiment. In this respect, it is different from the headrest 1b according to the third embodiment. The neck-support portion 3 and the end-part extending portion 4a are united into an auxiliary body 30a. As shown in FIG. 6B, when the neck-support portion 3 is kept in the second posture, in the headrest 1c, a concave portion 38 (see the hatching of FIGS. 6A, 6B) is formed by the front surface or the upper surface of the neck-support portion 3, the interior surface of the end-part extending portion 4a, and the front surface of the headrest body 2a. The concave portion 38 is long sideways in the seat-width directions.

In addition, even in the first posture, this concave portion 38 is designed to be formed, although it is narrower than that in the second posture.

In the headrest 1c, the switching procedure from the first posture to the second posture, and vice versa, is the same as that of the headrest 1b according to the third embodiment. The headrest 1c has all the operation and advantages of the headrest 1b, and in addition, it has the following operation and advantages.

The second posture of the neck-support portion 3 (or the auxiliary body 30a) is suitable, for example, in the case where a great lateral G rocks the head part 41 of the occupant 40 sideways largely, and thus, the function of adequately restraining the head part 41 from moving not only rearward but also sideways is required. Or, it is suitable in the case where the occupant 40 is taking a nap, or is doing another such, so that the occupant 40 cannot become aware of keeping the posture of the head part 41, or in another such case.

As shown in FIG. 6B, when the neck-support portion 3 is kept in the second posture, if the occupant 40 leans the head part 41 against the headrest 1c, then the back part of the head part 41 is fitted into the concave portion 38. Therefore, even if a great lateral G is applied to the occupant 40, or unless the occupant 40 becomes aware of keeping the posture of the head part 41, then the head part 41 will not come off the headrest body 2a. At the same time, the neck part 42 will not be brought out of the neck-support portion 3, either. Thereby, the head part 41 can be effectively retrained inside of the concave portion 38.

Furthermore, the concave portion 38 is long sideways in the seat-width directions. This allows the head part 41 to sway laterally to some extent inside of the concave portion 38. Therefore, when the vehicle is running, the head part 41 rocks sideways moderately. This gives the occupant 40 a feeling of greater comfort.

On the other hand, even when the neck-support portion 3 is used in the first posture, the concave portion 38 is formed, although it is smaller than that in the second posture. Therefore, unless the neck-support portion 3 supports the neck part 42, the head part 41 is placed into the concave portion 38. This keeps it from swaying sideways excessively.

Figure 7:
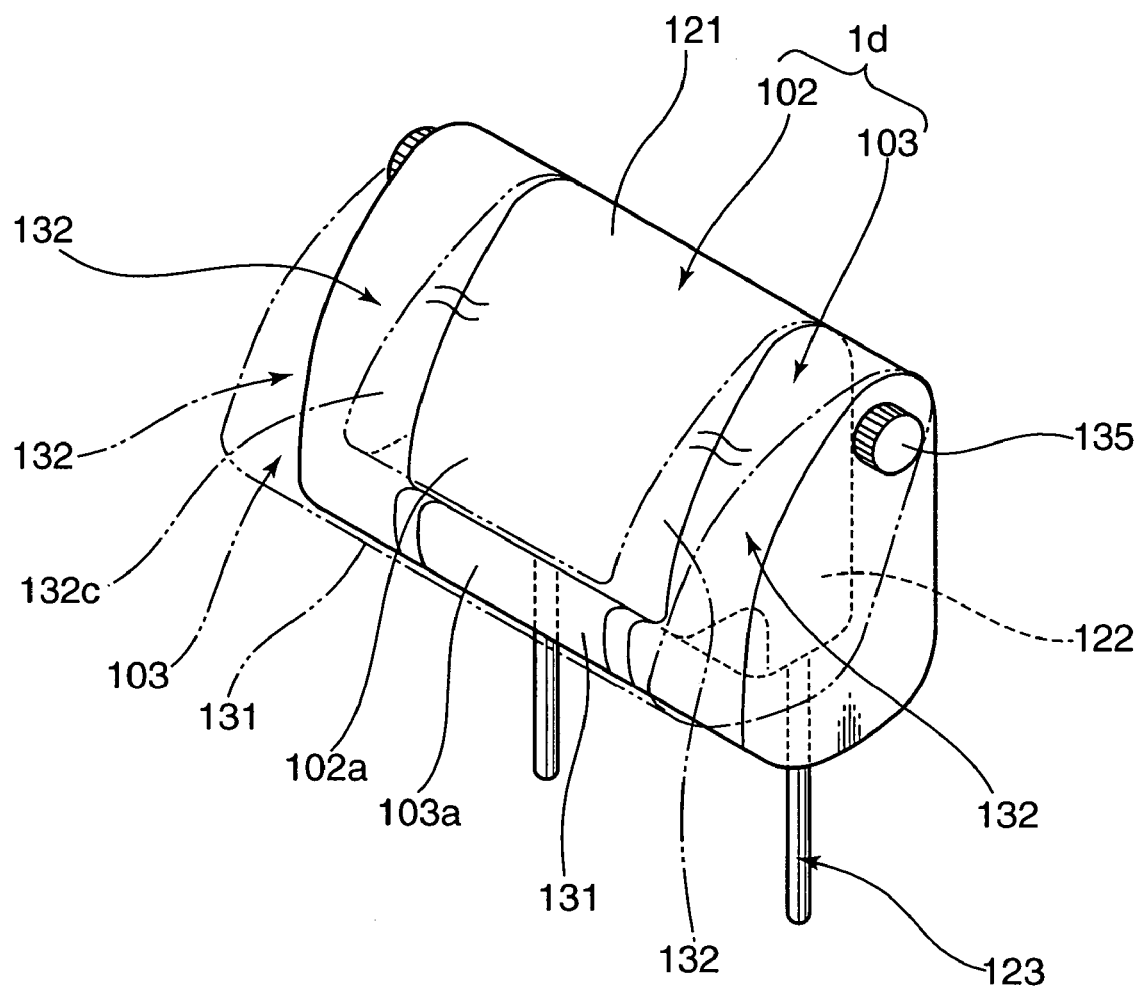
FIG. 7 is a perspective view of a headrest of a headrest-attached vehicle seat according to a fifth embodiment of the present invention.
Figure 8:
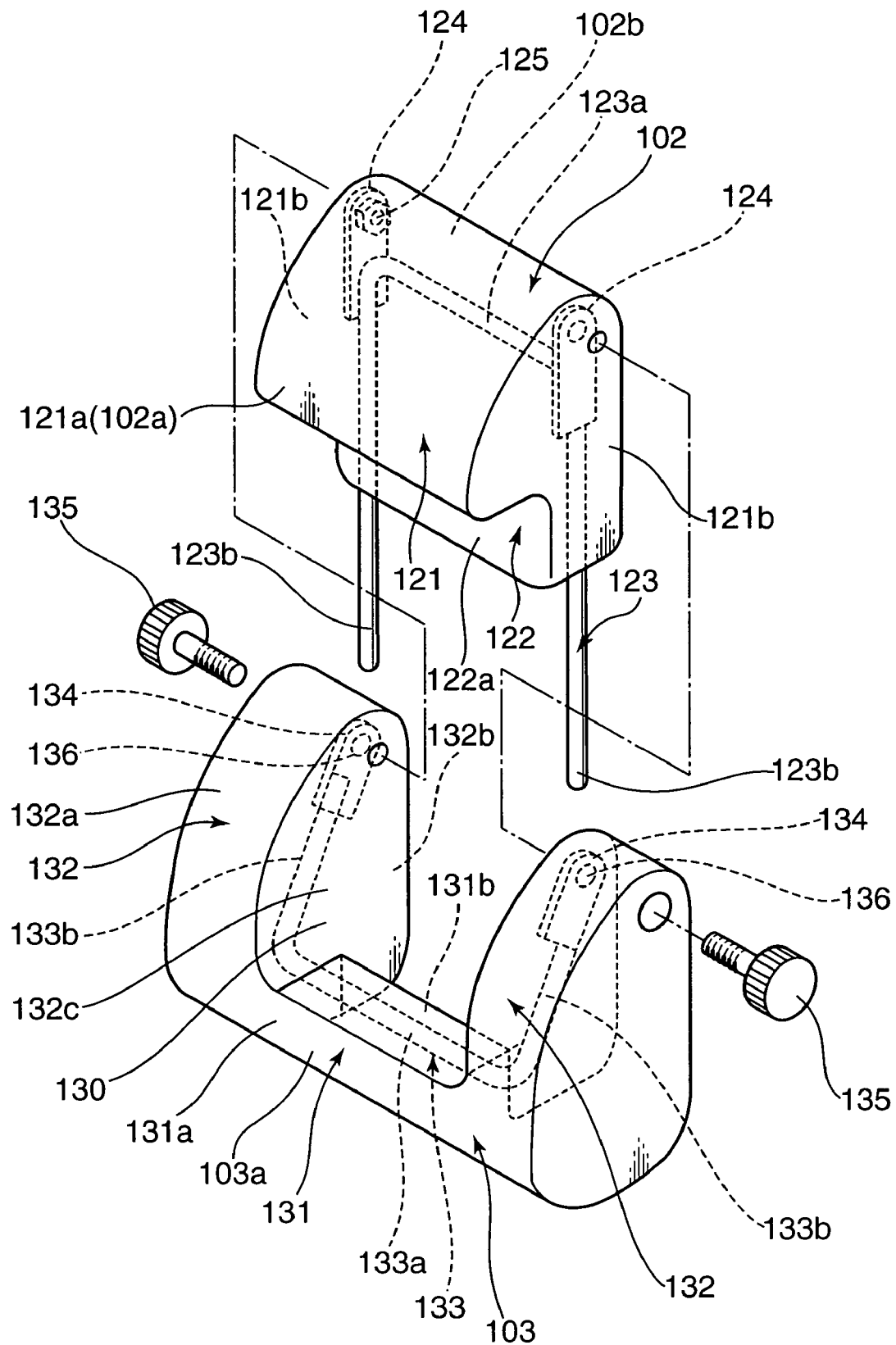
FIG. 8 is a perspective exploded view of the headrest shown in FIG. 7.
Figure 9:
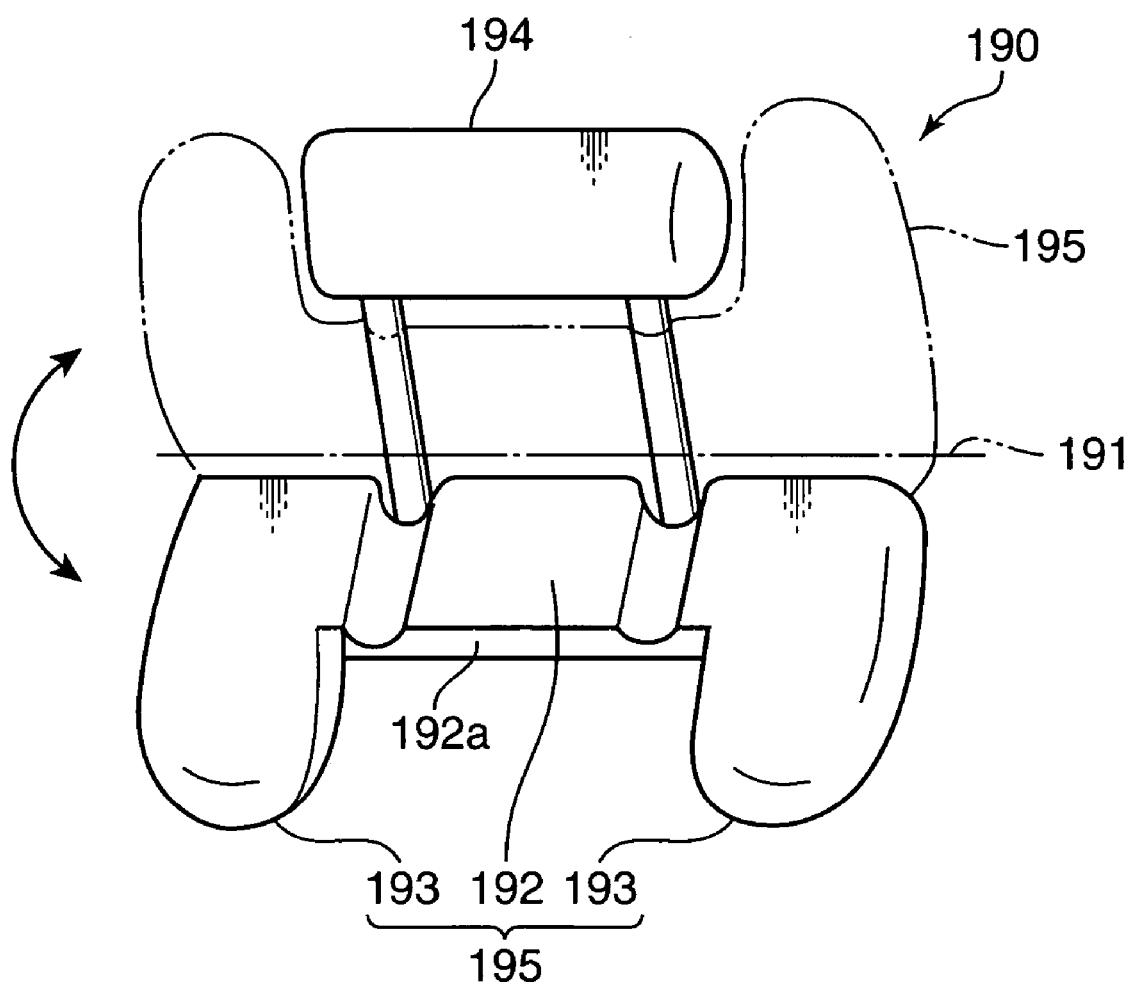
FIG. 9 is a perspective view of a headrest according to a prior art.

FIG. 7 is a perspective view of a headrest 1d of a headrest-attached vehicle seat according to a fifth embodiment of the present invention. FIG. 8 is a perspective exploded view of the headrest 1d. The headrest 1d is roughly configured by a headrest body 102 and an auxiliary body 103.

First, the structure of the headrest body 102 will be described. The headrest body 102 is, for example, a molded body which is produced by skin composite foaming. It includes a head-support portion 121 which is shaped as a whole like a long pillow, and an extending portion 122 (or a downward-extending portion which corresponds to the downward-extending portion 7 according to each of the second to fourth embodiments) which extends on the side of the lower surface of the head-support portion 121. The extending portion 122 is located behind the middle of the head-support portion 121 in the front-and-rear directions. There is a step between a front surface 122a of the extending portion 122 and a front surface 121a of the head-support portion 121 (i.e., a front surface 102a of the headrest body 102).

In addition, inside of this headrest body 102, a pole 123 is disposed, with a base portion 123a thereof kept buried. The pole 123 is formed by the base portion 123a, and a pair of right and left leg portions 123b, 123b which extend substantially perpendicularly to the base portion 123a on both right-and-left sides thereof. Each leg portion 123b, 123b protrudes downward from the bottom surface of the extending portion 122. To each of both ends of the base portion 123a of this pole 123, or to the top end of each leg portion 123b, 123b, a bracket 124 is attached which includes a nut 125.

Next, the structure of the auxiliary body 103 will be described. The auxiliary body 103 is, for example, a molded body which is produced by skin composite foaming. It includes a neck-support portion 131 (which corresponds to the neck-support portion 3 according to each of the first to fourth embodiments) which extends in the seat-width directions, and a pair of right and left side support portions 132, 132 (which corresponds to the end-part extending portions 4a according to the fourth embodiment) which extends continuously from both right-and-left ends of the neck-support portion 131 and substantially perpendicularly thereto. As a whole, its middle part in the right-and-left directions is cut off into a rectangular shape from its upper end, so that it has a rectangular concave shape. Then, the headrest body 102 is disposed so as to be fitted and inserted into such a rectangular cut-off portion 130 as described above. Thereby, the headrest 1d is formed.

The neck-support portion 131 has a slightly greater width than that of the headrest body 102. Its depth (i.e., the distance between a front surface 131a and a rear surface 131b) is substantially equal to the difference in level between the front surface 121a of the head-support portion 121 and the front surface 122a of the extending portion 122 in the headrest body 102.

In the side support portion 132, a front surface 132a thereof is on the same level with the front surface 131a of the neck-support portion 131. A rear surface 132b thereof is substantially on the same plane with a rear surface 102b of the headrest body 102 when the auxiliary body 103 is attached to the headrest body 102. Therefore, between the rear surface 131b of the neck-support portion 131 and the rear surface 132b of the side support portion 132, there is a difference in level which is equivalent to the thickness of the extending portion 122 of the headrest body 102.

In addition, inside of the auxiliary body 103, a core body 133 is buried. The core body 133 is formed by the base portion 133a, and a pair of right and left leg portions 133b, 133b which extend perpendicularly to the base portion 133a on both right-and-left sides thereof. The base portion 133a and each leg portion 133b, 133b correspond to the neck-support portion 131 and each side support portion 132, respectively. To the tip part of each leg portion 133b, 133b, or to the top end of each leg portion 123b, 123b, a bracket 134 is attached which includes a bolt hole 136.

Next, description will be given about how the headrest body 102 is attached to the auxiliary body 103. First, the headrest body 102 is disposed so as to be fitted and inserted into the rectangular cut-off portion 130 of the auxiliary body 103. Besides, the nut 125 which is provided in each bracket 124 on the side of the headrest body 102 is positioned on the same axis with the bolt hole 136 of each bracket 134 on the side of the auxiliary body 103. At this state, a bolt 135 (i.e., a lateral shaft) is inserted from the outside into each side support portion 132, 132 of the auxiliary body 103. Then, this is fixed with the nut 125, so that they are combined into one, or the headrest 1d shown in FIG. 7.

Next, the operation and the like of the headrest 1d will be described. The headrest 1d which is configured as described above is attached to the seat back 51 by fitting and inserting the leg portions 123b, 123b of the pole 123 of the headrest body 102 into pole holders (not shown) which are provided in the upper-end parts of the seat back 51. In this headrest 1d, the auxiliary body 103 can be turned around the bolts 135, 135 in the front-and-rear directions. Thus, its posture can be changed from the first posture (see a solid line of FIG. 7) to the second posture (see a chain double-dashed line in the same figure), and vice versa.

Herein, in the second posture, the posture of the auxiliary body 103 is held by the screwed-in force of the bolt 135 (i.e., the frictional force which is applied between a side surface 121b of the headrest body 102 and an interior surface 132c of the side support portion 132).

The first posture is preferable, for example, in the case where the head part 41 of the occupant 40 is not swayed sideways so much, and thus, the function of restraining the head part 41 from moving back is mainly required. In this first posture, the front surface 102a of the headrest body 102 and a front surface 103a (which is made up of the front surface 131a of the neck-support portion 131 and the front surface 132a of the side support portion 132) of the auxiliary body 103 forms substantially the same plane. Over this large area, the head part 41 of the occupant 40 can be retrained, thus more securely keeping the head part 41 in position. Herein, in this first posture, the front surface 122a of the extending portion 122 in the headrest body 102 is in contact and engaged with the rear surface 131b of the neck-support portion 131 in the auxiliary body 103. This engagement prevents the neck-support portion 103 from moving back farther, thus restraining the head part 41 more certainly.

In contrast, the second posture of the neck-support portion 3 (or the auxiliary body 30a) is suitable, for example, in the case where a great lateral G rocks the head part 41 of the occupant 40 sideways largely, and thus, the function of adequately restraining the head part 41 from moving not only rearward but also sideways is required. Hence, in this second posture, the lower-end side of the auxiliary body 103 extends forward from the front surface 102a of the headrest body 102. Thus, in the neck-support portion 131, its front surface 131a is located ahead of the front surface 121a of the head-support portion 121 in the headrest body 102. Besides, as the side support portion 132 extends toward its lower end, it juts out farther from the headrest body 102. As a result, the interior surface 132c of the side support portion 132 is exposed in a substantially triangular shape ahead of the front surface 102a of the headrest body 102.

Therefore, in the second posture, if the occupant 40 leans the head part 41 on the side of the headrest 1d, the neck part 42 a little ahead of the back of the head corresponds exactly to the neck-support portion 131. Besides, the side of the head which extends slightly behind the position above the neck part 42 corresponds to the exposed interior surface 132c of the side support portion 132. As a result, for example, if the load of a great lateral G rocks the head part 41 of the occupant 40 sideways, the interior surface 132c of the side support portion 132 certainly keeps it in place. In addition, the head part 41 is surely restrained from moving back, not only by the headrest body 102 which corresponds to the back of the head, but also by the neck-support portion 131 which is located under it. The synergy effect of both component parts helps protect the occupant 40 more securely.

As can be obviously seen from the description given so far, in the above described embodiments, in the headrest-attached vehicle seat 50 in which the headrest 1 is provided over the seat back 51, the headrest 1 includes the headrest body 2, and the neck-support portion 3 which is provided under the headrest body 2; and this neck-support portion 3 turns around the lateral shaft (or the pivot 26) which extends in the seat-width directions inside of the headrest body 2 and moves in the front-and-rear directions, and can be positioned at a predetermined turning angle. Therefore, the headrest 1 can be kept from becoming larger. Besides, the head part 41 of the occupant 40 can be restrained and the neck part 42 can be properly supported. Especially, the head part 41 of the occupant 40 can be restrained from moving back excessively. This helps protect the occupant 40 more securely when the vehicle bumps. In addition, if necessary, the neck-support portion 3 is turned and moved forward, thereby supporting the head part 41 of the occupant 40 from behind. For example, let's assume the case where the occupant 40 is relaxed (or asleep) and seated in the reclining state in which the seat back 51 is kept reclined so that the occupant 40's upper-half body can be leaned. If a great inertia force (including a lateral G) is applied when the vehicle is running, or in another such case, then the load on the neck part 42 can be lightened because the head part 41 is supported by the neck-support portion 3. This allows the occupant 40 to feel more comfortable.

Furthermore, the neck-support portion 3 is provided under the headrest body 2, and turns around the lateral shaft (or the pivot 26) inside of the headrest body 2. Hence, when the neck-support portion 3 is under the headrest body 2, the tangential line of the turning circle of the neck-support portion 3 is substantially horizontal. In that state, if the neck-support portion 3 is turned, it moves largely in the front-and-rear directions which is the substantially tangential directions of the turning circle. At that time, however, it makes hardly any motion in the up-and-down directions. In other words, in such a frequently-used mode, the position of the neck-support portion 3 can be adjusted widely enough in the front-and-rear directions.

Moreover, even if the neck-support portion 3 is moved by a relatively long distance in the front-and-rear directions, it moves only a little in the up-and-down directions. Therefore, the height position of the neck-support portion 3 is not changed so much, and thus, its low position can be kept. Hence, the headrest body 2 can be provided in a relatively low position (i.e., near the seat back 51). This presents an effective head restraining effect, without making the headrest 1 larger.

In addition, the lateral shaft (or the pivot 26) is provided on the upside in the headrest body 2. Thereby, the turning radius of the neck-support portion 3 becomes longer than that in the case where the lateral shaft is provided on the downside in the headrest body 2. In other words, the distance of a motion in the front-and-rear directions which corresponds to the turning angle becomes greater. Hence, an adjustment can be made over a longer distance in the front-and-rear directions.

Furthermore, the downward-extending portion 7 which extends downward is provided in the headrest body 2. Then, the downward-extending portion 7 comes into contact, from behind, with the neck-support portion 3 when the neck-support portion 3 is in its rearmost position. In that case, the downward-extending portion 7 is in contact with the neck-support portion 3. The downward-extending portion 7 restricts the neck-support portion 3's backward movement from the rearmost position. Specifically, for example, when the vehicle collides, or in such a case, if an excessive backward load is applied to the head part 41 of the occupant 40, then the neck-support portion 3 can be more certainly kept from moving back overly.

Moreover, the front surface of the neck-support portion 3 is curved, so that both end sides of the neck-support portion 3 in the seat-width directions protrude forward from the middle part thereof. In that case, when the neck-support portion 3 supports the neck part 42, using its curved shape, for example, even if the occupant 40 receives lateral G, and the head part 41 is swayed sideways, then restoring force is applied to the neck part 42, so that it can be restored to the middle in the seat-width directions. Hence, the neck part 42 is restrained from swaying sideways excessively.

In addition, the end-part extending portion (or the auxiliary bodies 30, 30a) which extends upward is formed in at least one end part of the neck-support portion 3 in the seat-width directions, if seen from ahead, the neck-support portion 3 is in its rearmost position. Then, the end-part extending portion is supported on the lateral shaft (or the pivot 26), so as to be united and turned with the neck-support portion 3. In that case, the occupant 40 can grasp this end-part extending portion of the neck-support portion 3 and turn the neck-support portion 3. As a result, it can be turned more easily, thus facilitating a fine positional adjustment greatly. In this case, as described above, if the pivot 26 is provided on the upside in the headrest body 2, the position can be finely adjusted more easily.

Furthermore, when the neck-support portion 3 is turned at least in a position ahead of its rearmost position, in the headrest 1, the concave portion 38 is formed by the front surface or the upper surface of the neck-support portion 3, the interior surface of the end-part extending portion (the auxiliary body 30a) which faces the side surface of the headrest body 2, and the front surface of the headrest body 2. In that case, when the neck-support portion 3 supports the neck part 42 or the back of the head part 41, the head part 41 of the occupant 40 can be fitted into the concave portion 38. Thus, the head part 41 which is kept fitted into the concave portion 38 is prevented from coming off the concave portion 38. For example, even if the occupant 40 is taking a nap so that the occupant 40 cannot become aware of keeping the posture of the head part 41 in position, then the back of the head part 41 is left to the concave portion 38, and thus, the head part 41 remains restrained by the headrest 1. This helps effectively protect the occupant 40 more securely and makes the occupant 40 more comfortable.

Moreover, the concave portion 38 is formed even when the neck-support portion 3 is in its rearmost position. In that case, even when the neck-support portion 3 is in its rearmost position, the concave portion 38 restrains the head part 41 from swaying sideways excessively.

In addition, the seat 50 is provided with the reclining mechanism 55 for freely reclining the seat back 51. In that case, if the occupant 40 sets the seat 50 to the reclining state, the occupant 40 can be relaxed enough and seated. Specifically, the head part 41 and the neck part 42 are supported by the headrest body 2 and the neck-support portion 3, respectively. Thereby, the load on the neck part 42 becomes far lighter than in the case where only the head part 41 is supported by the headrest body 2. This makes the occupant 40 more comfortable.

So far, the embodiments of the present invention have described. However, the present invention is not limited to those embodiments. Variations may also be applied within the claims. For example, the end-part extending portion 4 of the headrest 1b shown in FIG. 5 is not necessarily provided in each of both right and left end parts thereof. It may also be provided only in either of them.

Furthermore, in the fifth embodiment, the headrest body 102 and the auxiliary body 103 are engaged by means of the bolt 135 and the nut 125. However, they are not necessarily engaged by that means. For example, the bracket 134 may also be provided with a member which corresponds to the pivot 26 according to each of the first to fourth embodiments, and the bracket 124 may also be provided with a member which corresponds to the shaft-support member 10a according to each of the first to fourth embodiments. In that case, those are connected by means of a mechanism which corresponds to the friction mechanism according to each of the first to fourth embodiments.

Moreover, the reclining mechanism 55 is not limited to a mechanical type in which the reclining angle is adjusted using the lever 53. It may also be an electrically-driven mechanism which is provided with a motor or the like.

As can be obviously seen from the description given so far, with respect to an engine starting apparatus according to the present invention, in a headrest-attached vehicle seat in which a headrest is provided over a seat back: the headrest includes a headrest body, and a neck-support portion which is provided under the headrest body; and the neck-support portion turns around a lateral shaft which extends in the seat-width directions inside of the headrest body and moves in the front-and-rear directions, and the neck-support portion is positioned at a predetermined turning angle. This headrest-attached vehicle seat is capable of keeping a headrest from becoming larger, restraining an occupant's head effectively, and if necessary, properly supporting the occupant's neck, using its adequate adjustment width.

In summary, the headrest-attached vehicle seat according to the present invention, in which a headrest is provided over a seat back, wherein: the headrest includes a headrest body, and a neck-support portion which is provided under the headrest body; and the neck-support portion turns around a lateral shaft which extends in the seat-width directions and is provided on the headrest body and moves in the front-and-rear directions, and the neck-support portion is positioned at a predetermined turning angle.

Furthermore, the headrest-attached vehicle seat according to the present invention may also be configured so that the lateral shaft is disposed on the upside of the headrest body.

Moreover, the headrest-attached vehicle seat according to the present invention may also be configured so that: a downward-extending portion which extends downward is formed in the headrest body; and the downward-extending portion comes into contact, from behind, with the neck-support portion when the neck-support portion is in its rearmost position.

In addition, the headrest-attached vehicle seat according to the present invention may also be configured so that the front surface of the neck-support portion is curved, so that both end sides of the neck-support portion in the seat-width directions protrude forward from the middle part thereof.

Furthermore, the headrest-attached vehicle seat according to the present invention may also be configured so that: an end-part extending portion which extends upward is formed in at least one end part of the neck-support portion in the seat-width directions, if seen from ahead, when the neck-support portion is in its rearmost position; and the end-part extending portion is supported on the lateral shaft, so as to be united and turned with the neck-support portion.

Moreover, the headrest-attached vehicle seat according to the present invention may also be configured so that when the neck-support portion is turned at least in a position ahead of its rearmost position, in the headrest, a concave portion is formed by the front surface or the upper surface of the neck-support portion, the interior surface of the end-part extending portion which faces the side surface of the headrest body, and the front surface of the headrest body.

In addition, the headrest-attached vehicle seat according to the present invention may also be configured so that the concave portion is formed even when the neck-support portion is in its rearmost position.

Furthermore, the headrest-attached vehicle seat according to the present invention may also be configured so that a reclining mechanism for freely reclining the seat back is provided.

Herein, in this specification, the up-and-down, front-and-rear and right-and-left directions indicate, as their reference, the direction in which an occupant is seated in a seat with keeping the body's upper half substantially vertical. Or, they indicate the direction in which an occupant is seated in the driver's seat and is driving the vehicle. However, this reference is excluded if such a description is especially given.

This application is based on Japanese patent application Ser. No. 2004-84458 and Ser. No. 2005-36852, filed in Japan Patent Office on Mar. 23, 2004 and Feb. 14, 2005, respectively, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A headrest-attached vehicle seat comprising:
a seat back; and
a headrest body having a frontal surface which is adapted to hold a back of a passenger's head;
a lateral shaft which extends in the seat-width direction and is provided at an upper portion of the headrest body;
a neck-support portion which is provided on a lower side of the headrest body via said lateral shaft in such a manner that said neck-support portion is rotatable with respect to said headrest body around an axis of said lateral shaft, said neck-support portion is pivoted with respect to the headrest body from its rearmost position to a forward position;
an end-part extending portion which extends upward from at least one end part of the neck-support portion in the seat-width direction, if seen from ahead, when the neck-support portion is in its rearmost position; the end-part extending portion being supported on the lateral shaft, so as to be united and turned with the neck-support portion;
a position holding means for holding an angular position of the neck-support portion at a desired angle with respect to the headrest body; and
a downward-extending portion, integrally formed with the headrest body, extending downward from the headrest body, the downward-extending portion coming into contact, from behind, with the neck-support portion when the neck-support portion is in its rearmost position,
wherein the headrest has a concave portion which is formed by a frontal surface or an upper surface of the neck-support portion, an interior surface of the end-part extending portion which faces a side surface of the headrest body, and the frontal surface of the headrest body when the neck-support portion is in a posture where the neck-support portion is turned forward from said rearmost position; and
wherein the frontal surface of the headrest body is substantially on the same plane with the frontal surface of the neck-support portion so as to support the back side of the occupant's head when the neck-support portion is in the rear end position.

2. A headrest-attached vehicle seat comprising:
a seat back; and
a headrest which is provided over the seat back, said headrest including:
a headrest body having a frontal surface which is adapted to support a back of a passenger's head;
a lateral shaft which extends in a lateral direction through the headrest body, said lateral shaft being provided on the headrest body above a middle in an up-and-down direction of the headrest body;
a neck-support portion which extends in the lateral direction and is provided on a lower side of the headrest body, said neck-support portion has a frontal surface, positioned beneath said frontal surface of the headrest body so that said neck support portion supports the back of the passenger's neck from a direction, which is the same direction from which the headrest body supports the back of the passenger's head;
a turning arm which connects at least one end of said neck-support portion with said lateral shaft in such a manner that said neck-support portion is rotatable with respect to said headrest body around an axis of said lateral shaft between a rear-end position and a front-end position, said turning arm extends from the lateral end of the neck-support portion along a lateral side of the headrest, if seen from ahead, when the neck-support portion is in its rearmost position; and said turning arm being supported on the lateral shaft, so as to be united and turned with the neck-support portion; and
a position holding means for holding an angular position of the neck-support portion at any desired angle position with respect to the headrest body between said rear-end position and said front-end position so that the neck-support portion provides a support to the back of the occupant's neck,
wherein the frontal surface of the headrest body is substantially on the same plane with the frontal surface of the neck-support portion when the neck-support portion is in the rear end position.

3. The headrest-attached vehicle seat according to claim 2, wherein a front surface of the neck-support portion is curved, so that both end sides of the neck-support portion in the seat-width directions protrude forward from a middle part thereof.

4. The headrest-attached vehicle seat according to claim 2, wherein said headrest body is supported by a pole which extends from a top end of the seat back, and the height of the headrest body is adjustable along with said pole with a height adjusting mechanism and said neck-support portion laterally extends on the front side of the pole.

5. The headrest-attached vehicle seat according to claim 2, wherein the neck-support portion has a width which is substantially equal to that of the headrest body.

6. The headrest-attached vehicle seat according to claim 2, wherein a top portion of the turning arm is fixed onto the lateral shaft and said position holding means includes an engagement portion provided on said lateral shaft and an engaged portion provided on a shaft support member provided on a lateral side of the headrest body such that said engagement portion is biased towards said engaged portion by a predetermined force so that a friction contact occurs between the lateral shaft and the shaft support member.

7. The headrest-attached vehicle seat according to claim 2, wherein a downward-extending portion which extends downward is formed in the headrest body; and the downward-extending portion comes into contact, from behind, with the neck-support portion when the neck-support portion is in its rearmost position.

8. A headrest-attached vehicle seat comprising:
a seat back; and
a headrest which is provided over the seat back, said headrest including:
a headrest body having a frontal surface which is adapted to support a back of a passenger's head;
a lateral shaft which extends in a lateral direction through the headrest body, said lateral shaft being provided on the headrest body above a middle in an up-and-down direction of the headrest body;
a neck-support portion which extends in the lateral direction and is provided on a lower side of the headrest body, said neck-support portion has a frontal surface, positioned beneath said frontal surface of the headrest body so that said neck support portion supports the back of the passenger's neck from a direction, which is the same direction from which the headrest body supports the back of the passenger's head;
a pair of left and right turning arms, each of which has a lower end, said lower end of each of said turning arms, is connected to a corresponding one lateral end of said neck-support portion and an opposite end of each of said turning arms is mounted on said lateral shaft in such a manner that said neck-portion, together with said turning arm pair, is rotatable with respect to said headrest body around an axis of said lateral shaft between a rear-end position and a front-end position; and
a position holding means for holding an angular position of the neck-support portion at any desired angle position with respect to the headrest body between said rear-end position and said front-end position so that the neck-support portion provides a support to the back of the occupant's neck and wherein the frontal surface of the headrest body is substantially on the same plane with the frontal surface of the neck-support portion so as to support the back side of the occupant's head when the neck-support portion is in the rear end position.

9. The headrest-attached vehicle seat according to claim 8, further comprising a reclining mechanism for freely reclining the seat back.

10. The headrest-attached vehicle seat according to claim 8, said position holding means includes an engagement portion provided on said lateral shaft and an engaged portion provided on a shaft support member provided on a lateral side of the headrest body such that said engagement portion is biased towards said engaged portion by a predetermined force so that a friction contact occurs between the lateral shaft and the shaft support member.

11. The headrest-attached vehicle seat according to claim 8, wherein the headrest body and the neck-supporting portion are so configured that a concave portion is formed by a front surface or an upper surface of the neck-supporting portion and a front surface of the headrest body when the neck-supporting portion is held at a position moved away from a rearmost position.

12. The headrest-attached vehicle seat according to claim 11, wherein said concave portion is formed along a lateral direction.

13. The headrest-attached vehicle seat according to claim 8, wherein when the neck-support portion is in the rear end position, the frontal surface of the headrest body is substantially on the same plane with the frontal surface of the neck-support portion.

14. The headrest-attached vehicle seat according to claim 8, wherein a downward-extending portion which extends downward is formed in the headrest body; and the downward-extending portion comes into contact, from behind, with the neck-support portion when the neck-support portion is in its rearmost position.

15. A headrest-attached vehicle seat comprising:
a seat back; and
a headrest which is provided over the seat back, said headrest including:
a headrest body having a frontal surface for supporting from a rear direction a back of a head of a passenger sitting on the vehicle seat facing a forward direction of the vehicle;
a lateral shaft, which extends in a lateral direction through the headrest body, said lateral shaft being provided on the headrest body above a middle in an up-and-down direction of the headrest body;
a neck-support portion which extends in the lateral direction and is provided on a lower side of the headrest body, said neck-support portion has a frontal surface, positioned beneath said frontal surface of the headrest body said frontal surface of the neck support portion supports from said rear direction the back of the neck of the passenger sitting on the vehicle seat facing the forward direction of the vehicle;
a turning arm which connects at least one lateral end of said neck-support portion with said lateral shaft in such a manner that said neck-support portion is rotatable with respect to said headrest body around an axis of said lateral shaft between a rear-end position and a front-end position, said turning arm extends from the lateral end of the neck-support portion along a lateral side of the headrest, if seen from ahead, when the neck-support portion is in its rearmost position and said turning arm being supported on the lateral shaft, so as to be united and turned with the neck-support portion; and
a position holding means for holding an angular position of the neck-support portion at any desired angle position with respect to the headrest body between said rear-end position and said front-end position so that the neck-support portion provides a support to the back of the occupant's neck;
wherein the frontal surface of the headrest body is substantially on the same plane with the frontal surface of the neck-support portion when the neck-support portion is in the rear end position.

16. A headrest-attached vehicle seat comprising:
a seat back; and
a headrest which is provided over the seat back, said headrest including:
a headrest body having a frontal surface which is adapted to support a back of a passenger's head;
a lateral shaft which extends in a lateral direction through the headrest body, said lateral shaft being provided on the headrest body above a middle in an up-and-down direction of the headrest body;
a neck-support portion which extends in the lateral direction and is provided on a lower side of the headrest body, said neck-support portion has a frontal surface, positioned beneath said frontal surface of the headrest body so that said neck support portion supports the back of the passenger's neck from a direction, which is the same direction from which the headrest body supports the back of the passenger's head; the frontal surface of the neck-support portion is curved, so that both end sides of the neck-support portion in the seat-width directions protrude forward from a middle part thereof;

a turning arm which connects at least one lateral end of said neck-support portion with said lateral shaft in such a manner that said neck-support portion is rotatable with respect to said headrest body around an axis of said lateral shaft between a rear-end position and a front-end position; and a position holding means for holding an angular position of the neck-support portion at any desired angle position with respect to the headrest body between said rear-end position and said front-end position so that the neck-support portion provides a support to the back of the occupant's neck.

* * * * *

UNITED STATES PATENT AND TRADEMARK OFFICE
CERTIFICATE OF CORRECTION

| | |
|---|---|
| PATENT NO. | : 7,410,218 B2 |
| APPLICATION NO. | : 11/085266 |
| DATED | : August 12, 2008 |
| INVENTOR(S) | : Tadao Kotani et al. |

It is certified that error appears in the above-identified patent and that said Letters Patent is hereby corrected as shown below:

Title Page; should read;
(73) Assignee: Toyo Seat Co., Ltd., Osaka, (JP); Mazda Motor Corporation, Hiroshima (JP)

Signed and Sealed this

Fourteenth Day of April, 2009

JOHN DOLL
*Acting Director of the United States Patent and Trademark Office*